United States Patent
Aref et al.

(10) Patent No.: US 6,662,180 B1
(45) Date of Patent: Dec. 9, 2003

(54) METHOD FOR SEARCHING IN LARGE DATABASES OF AUTOMATICALLY RECOGNIZED TEXT

(75) Inventors: Walid G. Aref, Monmouth Junction, NJ (US); Junichi Kanai, East Windsor, NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/310,512

(22) Filed: May 12, 1999

(51) Int. Cl.[7] .................. G06F 17/30; G06F 7/00
(52) U.S. Cl. ............... 707/6; 382/159; 382/229; 382/321
(58) Field of Search .................. 707/1–6, 532; 382/159, 229, 321

(56) References Cited

U.S. PATENT DOCUMENTS

| | | | |
|---|---|---|---|
| 3,969,698 A | * 7/1976 | Bollinger et al. | 382/225 |
| 5,075,896 A | * 12/1991 | Wilcox et al. | 382/225 |
| 5,257,323 A | * 10/1993 | Melen et al. | 382/310 |
| 5,377,281 A | * 12/1994 | Ballard et al. | 382/229 |
| 5,418,864 A | * 5/1995 | Murdock et al. | 382/309 |
| 5,455,872 A | * 10/1995 | Bradley | 382/228 |
| 5,500,920 A | * 3/1996 | Kupiec | 704/270.1 |
| 5,524,240 A | * 6/1996 | Barbará et al. | 707/3 |
| 5,528,701 A | * 6/1996 | Aref | 382/178 |
| 5,553,284 A | * 9/1996 | Barbará et al. | 707/4 |
| 5,649,023 A | * 7/1997 | Barbará et al. | 382/159 |
| 5,768,423 A | * 6/1998 | Aref et al. | 382/228 |
| 5,850,480 A | * 12/1998 | Scanlon | 382/229 |
| 5,889,897 A | * 3/1999 | Medina | 382/310 |
| 5,950,158 A | * 9/1999 | Wang | 704/244 |
| 5,963,902 A | * 10/1999 | Wang | 704/243 |
| 6,047,093 A | * 4/2000 | Lopresti et al. | 382/310 |
| 6,304,674 B1 | * 10/2001 | Cass et al. | 382/224 |
| 6,351,574 B1 | * 2/2002 | Yair et al. | 382/321 |

OTHER PUBLICATIONS

Katz, S.M. "Estimation of Probabilities from Sparse Data for the Language Model Component of a Speech Recognizer", IEEE Transactions on Acoustics, Speech and Signal Processing, vol. ASSP–35, No. 3, Mar. 1987.*

(List continued on next page.)

*Primary Examiner*—Jean R. Homere
*Assistant Examiner*—Luke S Wassum
(74) *Attorney, Agent, or Firm*—RatnerPrestia (57) ABSTRACT

A method for searching for a query word in a database of automatically recognized text generated, for example by an optical character recognition (OCR) system or a speech recognition (SR) system finds entries that most closely match the query word. The database is indexed into a trie data structure, which represents all possible words in the database. The trie data structure has a plurality of branch nodes, each representing a letter of at least one word, and a plurality of leaf nodes, each representing a respective word. The trie data structure is searched for each query word by selecting the first letter of the query word and also selecting a root node in the trie data structure as the current node. All possible child nodes of the current node are identified. Respective estimated probability values for matching respective letters of the query word with the letters associated with the nodes in the path taken through the trie data structure are calculated for each identified child node. The identified child nodes are then placed into a list of candidate nodes. The node, in the list of candidate nodes, having the highest probability value is selected as the current node and is then deleted from the list of candidate nodes. The process repeats with this current node until a leaf node is reached. When a leaf node is reached, a determination is made whether to store the word into a list of best matches based on the probability value of the word compared to the probability values for all the words in the list of best matches.

11 Claims, 3 Drawing Sheets

OTHER PUBLICATIONS

Seymore, K. and R. Rosenfeld "Scalable Backoff Language Models", Proceedings of the 4$^{th}$ International Conference on Spoken Language Processing (ICSLP 96), pp. 232–235, Oct. 3–6, 1996.*

Nivre, J. "Sparse Data and Smoothing in Statistical Part-of-Speech Tagging", Journal of Quantitative Linguistics, vol. 7, No. 1, pp. 1–17, 2000.*

Garica–Varea, I, Casacuberta, F. and Ney, H. "An Iterative, DP–Based Search Algorithm for Statistical Machine Translation", Proceedings of the 5$^{th}$ International Conference on Spoken Language Proceesing (ICSLP '98), pp. 1135–1138, v.4, Dec. 1998.*

Seymore, K. and Rosenfeld, R. "Scalable Backoff Language Models", Proceedings of the 4$^{th}$ International Conference on Spoken Language Processing (ICSLP '96), pp. 232–235, Oct. 3–6, 1996.*

Seymore, K. and Rosenfeld, R. "Scalable Trigram Backoff Language Models", Technical Report CMU–CS–96–139, School of Computer Science, Carnegie Mellon University, May 1996.*

Charniak, E. et al., "Equations for Part–of–Speech Tagging", Proceedings of the 11th National Conference on Artificial Intelligence, pp. 784–789, 1993.*

Aho et al. "Data Structures and Algorithms", Reading:Addison–Wesley, 1982, pp. 163–169, QA76.9.D35A38 1982.*

Aref et al., "The Handwritten Trie: Indexing Electronic Ink", Proceedings of the 1995 ACM SIGMOD International Conference on Management of Data, May 22–25, 1995, pp. 151–162.*

Kamel et al. "Retrieving Electronic Ink by Content", Proceedings of the 1996 IEEE International Workshop on Multimedia Database Management Systems, Aug. 14–16, 1996, pp. 54–61.*

Knuth, Donald E., The Art of Computer Programming: vol. 3/Sorting and Searching, Reading:Addison–Wesley, 1997, pp. 492–512, QA76.6.K64 1997.*

H. Shang et al.; "Tries for Approximate String Matching" IEEE Transactions on Knowledge and Data Engineering, Aug. 1996, IEEE, USA, vol. 8 No. 4, pp. 540–547.

Andrew P. Berman; "A New Data Structure for Fast Approximate Matching"; Technical Report Mar. 2, 1994; pp. 1–10; Department of Computer Science and Engineering, University of Washington; http://citeseer.nj.nec.com/berman94ne.

EPO Search Report, Jan. 25, 2002.

* cited by examiner

METHOD FOR SEARCHING IN LARGE DATABASES OF AUTOMATICALLY RECOGNIZED TEXT

TECHNICAL FIELD

The present invention relates generally to the searching for query keywords in large databases of automatically recognized text and, more specifically, to a method for searching using approximate matching techniques which compensate for errors in text generated by an optical character recognition (OCR) system or a speech recognition (SR) system. The invention indexes the databases in a way that facilitates and speeds up the retrieval process.

BACKGROUND OF THE INVENTION

Large text retrieval systems are often built by extracting text information from documents using OCR or from spoken words, using a speech recognition system and inserting the extracted text into a database. OCR and SR devices are prone to errors and hence the database may contain erroneous words. This makes it difficult to retrieve documents that contain query words given by a user.

Today, it is common practice to store a large number of paper documents into a database. These documents need to be retrieved later by searching for some words that appear in the document. One way to achieve this is by extracting words from digitized documents using OCR technology. These words are then stored into the database and are used for searching and retrieval.

In addition, speech recognition systems are becoming more widely used. With a commercially available speech recognition system, a user may dictate a new document for the database or convert an existing document from text to machine readable form by simply reading the document into a microphone connected to a personal computer. While these systems are generally accurate with sufficient training, it is well known that some errors do occur. Typically, the speech recognition system allows these errors to be corrected manually by the user. A user may not, however, detect all of the errors and, so, the resulting database may include words which are not in the original text document.

Because neither OCR technology nor speech recognition technology is 100% error free, the scanned database may contain words that were misspelled in the conversion process. The conventional method of using direct searching techniques may not locate all of the appropriate documents in the database that contain a given query word because the corresponding word in the database is misspelled in some of the documents.

Another problem with the conventional method of using direct searching techniques is that the size of the database may be very large, and hence the search process may be very slow.

The conventional solution is insufficient to find words in the database that have been recognized incorrectly and are misspelled. Also, the conventional solution is too slow in searching large database. There is a need for a more efficient search algorithm.

SUMMARY OF THE INVENTION

To meet this and other needs, and in view of its purposes, the present invention provides a simple and effective method for searching for a query word in a hierarchical data structure. The data structure has branch nodes and leaf nodes, each branch node represents a respective portion of one or more words and each leaf node represents a word. The data structure is searched for each query word by selecting the first letter of the query word and also selecting a root node in the hierarchical data structure as the current node. All possible child nodes of the current node are identified. Respective estimated probability values for matching respective components of the query word with the components associated with the nodes in the path taken through the hierarchical data structure is calculated for each identified child node. The identified child nodes are then added to a list of candidate nodes The candidate node with the highest probability value is selected as the current node and is then deleted from the list of candidate nodes. If a leaf node has been reached, then a determination is made whether to store the word into a list of best matches. Processing repeats itself for each portion of the query word. When all portions of the query word have been matched, the matched words with their respective probability values are stored into the list of best matches.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

In order for retrieval systems in databases of automatically recognized text to function properly, each query keyword is desirably retrieved using matching techniques that account for the existence of errors in the automatically recognized text. In addition, it is desirable for the database to be indexed to speed up the search. Current search algorithms, however, do not search the index efficiently. A new search algorithm is provided that cures some of the deficiencies of other search techniques (e.g. depth-first).

Although the invention is described in terms of an exemplary embodiment which processes documents containing words that were automatically recognized using optical character recognition and speech recognition, the invention has more general application to processes in which an "alphabet" of symbols may be combined to form groupings of symbols that are then converted to a machinereadable form using an automated process which may erroneously recognize the groupings of symbols by substituting, inserting or deleting arbitrary symbols from any particular group.

Figure 1:
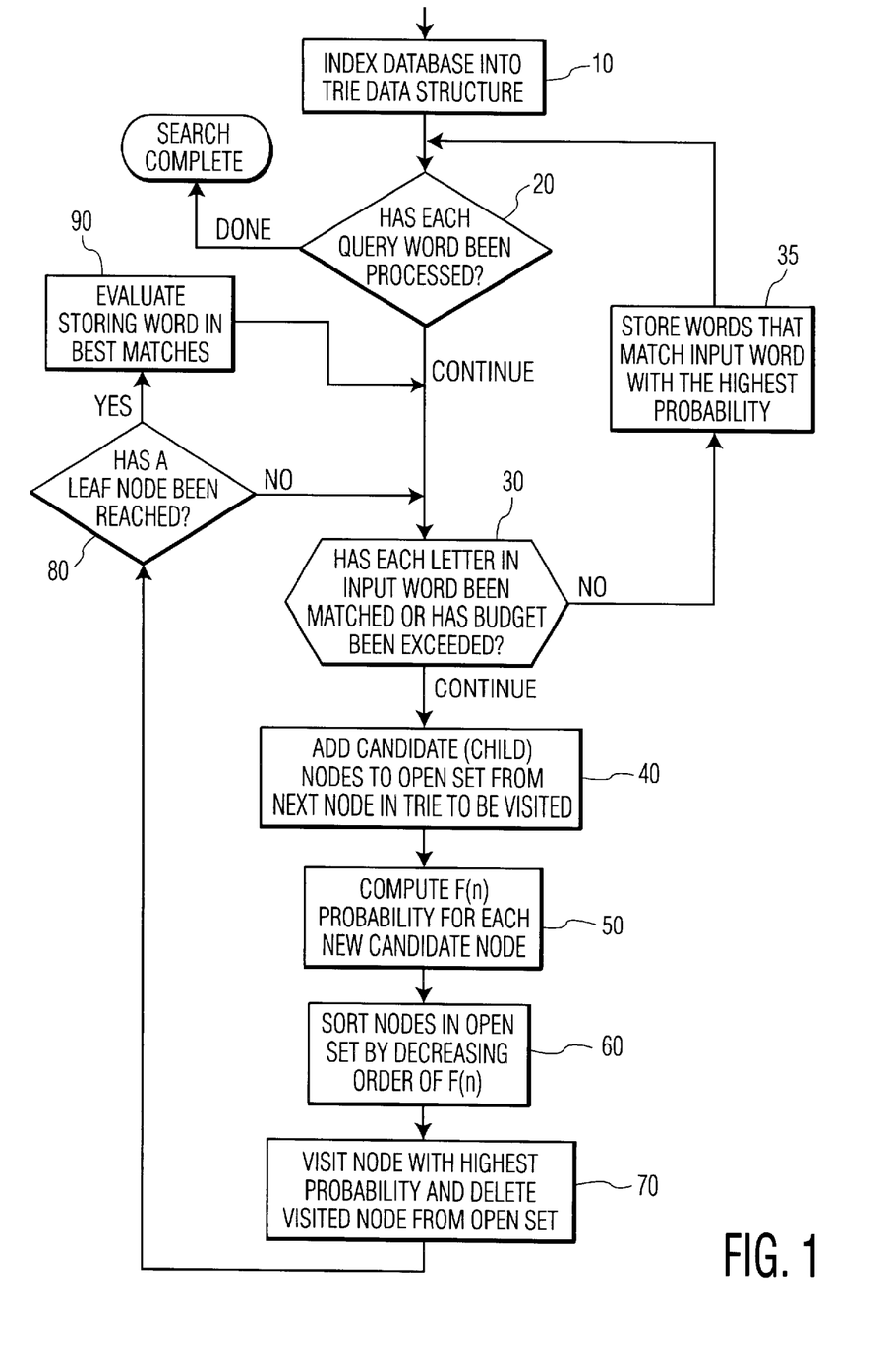
FIG. 1 is a high-level flow diagram of an exemplary embodiment of the present invention.

FIG. 1 shows an overview of an exemplary method for searching for query words in an indexed database according to the present invention. The search method is a computer program, which may reside on a carrier such as a disk, diskette or modulated carrier wave. As shown in FIG. 1, in step 10, the database, stored in a trie data structure, is indexed. Then, in decision step 20, each query input word is processed. In decision step 30, processing continues until each letter of the input word is processed or the budget is exhausted. When processing is completed, step 35 stores the words that best match the input word along with their associated probabilities and processing returns to step 20 to process the next input word.

Returning to decision step 30, if processing has not completed then control passes to step 40. In step 40, the candidate (child) nodes from the next level of the Trie are added to the list of candidate nodes (hereafter referred to as the OPEN set). If the first letter of a word is being processed at step 40, the root node of the Trie is added to the OPEN set.

Continuing with FIG. 1, in step 50, the probability f(n) for each newly added candidate node is calculated. In the exemplary embodiment of the present invention, the probability is calculated initially using a simplified error model (described below). The present invention provides a means for migrating from the simplified error model to a more detailed error model (also-described below) as sufficient training data becomes available.

In step 60, the OPEN set of candidate nodes is sorted by the probability f(n) that was calculated in step 50. Next, in step 70 the node with the highest probability is visited and is deleted from the OPEN set. In decision step 80, a check is made to determine if a leaf node has been reached on any of the branches of the Trie. Then in step 90, a determination is made whether to add the word that is associated with the leaf node to the list of best matches. Processing returns to decision block 30.

The search strategy according to the present invention advantageously removes the prefix sensitivity of the depth-first search method because it is capable of backtracking before following a branch off the Trie all the way to a leaf node.

According to a further aspect of the present invention, the search method for the Trie may also provide for matching in the presence of recognition errors. The errors in text generated using OCR or SR can be modeled as framing errors of the following types: insertion, deletion, and m-n substitution errors. The following explains each error type briefly and gives examples of their occurrences.

An insertion error occurs when extra letters are added into a word because of noise in a digitized document. An example of an insertion error is when the word "airmail" is recognized as "airnmail." In this case, the letter n is mistakenly inserted in the middle of the word by the scanner and OCR algorithm or by the microphone and the SR algorithm.

A deletion error occurs when some letters in the original word are omitted from the automatically recognized word. An example of a deletion error is when the word "airmail" is recognized as "aimail," i.e., missing the letter r.

An m-n substitution error occurs when m letters in the original word are substituted by n other symbols in the automatically recognized word. An example of a 1-2 substitution error is when the word "airmail" is seen by the system as the word "airrnail." In this case, the letter m of the original word is substituted by the letters r and n in the recognized word.

In order to compute the likelihood that one word maps to another word, the invention uses one of two models. These two models are the detailed and the simplified error models. Generally, the invention begins by using the simplified error model and may migrate to the detailed model once sufficient training data becomes available to populate the detailed model.

The detailed error model is described below. The detailed error model assumes that x, y, and z are letters of the alphabet. The notation $p_s(y|x)$ is used to denote the probability that the letter x in the database word is erroneously recognized as the letter y during the automatic recognition processes. In the detailed error model, the following probabilities are defined($\epsilon$ stands for the null letter):

$p_n(x)$: is the probability that the letter x is recognized properly without any errors during the recognition process, i.e., $p_n(x)=p_s(x|x)$.

$p_d(x)$: is the probability that the letter x is erroneously deleted from a word by the recognition process, i.e., $p_d(x)=p_s(\epsilon|x)$.

$p_i(x)$: is the probability that the letter x is erroneously inserted into a word by the recognition process, i.e., $p_i(x)=p_s(x|\epsilon)$.

$p_s(y|x)$: is the probability that the letter x is erroneously recognized as the letter y (a 1-1 substitution).

$p_s(yz|x)$: is the probability that the letter x is erroneously recognized as the two letters yz (a 1-2 substitution).

$p_s(z|xy)$: is the probability that the two letters xy are erroneously recognized as the letter z (a 2-1 substitution).

The values of these probabilities can be gathered statistically beforehand for each possible letter or combination of letters using a large training database.

Because the detailed probability model calculates a large number of probability values for each letter in the alphabet and for each possible pair of letter in the alphabet, it may be difficult to use. Accordingly, a simplified error model is defined which is limited to only estimating the following probabilities:

$p_n$: is the probability that no error occurs while recognizing a letter in a word.

$p_i$: is the probability that an insertion error occurs while recognizing a letter in a word.

$p_d$: is the probability that a deletion error occurs while recognizing a letter in a word.

$p_{11}$: is the probability that a 1-1 substitution error occurs while recognizing a letter in a word.

$p_{12}$: is the probability that a 1-2 substitution error occurs while recognizing a letter in a word.

$p_{21}$: is the probability that a 2-1 substitution error occurs while recognizing a letter in a word.

Notice that these variables are independent of the specific letters and hence are much simpler to estimate, requiring a much smaller training database than the detailed error model. On the other hand, the simplified error model is less accurate than the detailed error model.

The edit distance measure is used to estimate a measure of similarity between two words. The cost of mapping a query word $w_q$ to a database word $w_d$ is computed by determining the operations necessary to map $w_q$ to $w_d$ and multiplying the probability values associated with all the operations. For example, the similarity measure between the database word "art" and the query word "are" can be computed as: $p_n(a) \times p_n(r) \times p_s(t|e)$, using the detailed error model or $p_n \times p_n \times p_{11}$, using the simplified error model.

In the case when there is more than one set of operations that map one word to another, dynamic programming techniques may be used to find the set of operations with minimum cost (or with maximum likelihood). A dynamic programming algorithm can be used to compare any two words, e.g., a query word against a database word.

It should be noted though, that the method presented in the exemplary embodiment of the invention does not use dynamic programming techniques directly, because, to do this, would imply doing a sequential scan over the entire document database. Accordingly, the new method may be viewed as hierarchically searching through the document database and incrementally applying techniques similar to dynamic programming only to the portion of the database where it is more likely to find words that are closely similar to the query word.

Figure 2:
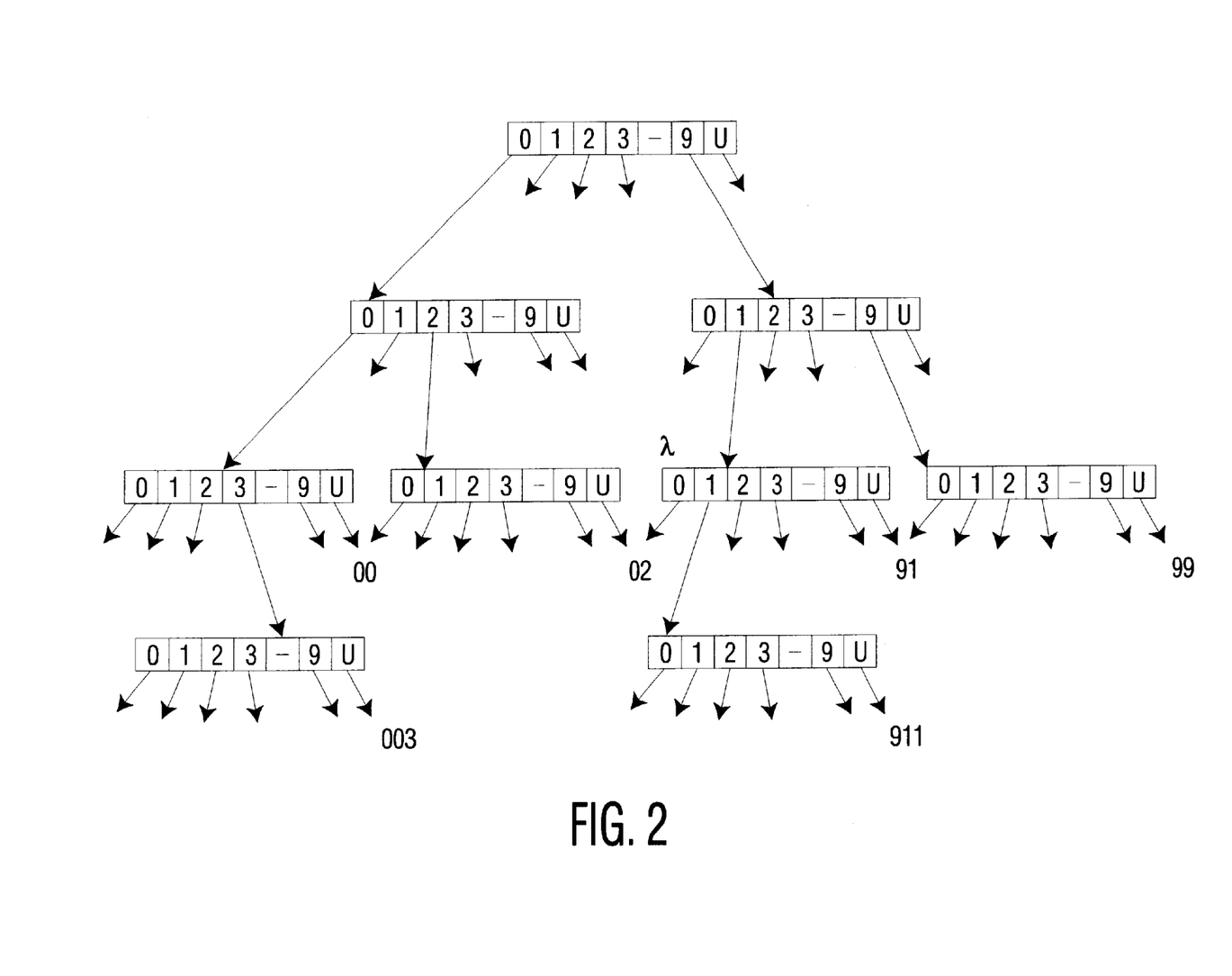
FIG. 2 is a data structure diagram which illustrates principles of operation of systems using a trie data structure.

The trie structure used in the exemplary embodiment of the invention is an M-ary tree, the nodes of which each have M entries, and each entry corresponds to a digit or a character of the alphabet. An example trie is given in FIG. 2 where the alphabet is the digits 0 . . . 9. Each node on level l of the trie represents the set of all keys that begin with a certain sequence of l characters; the node specifies an M-way branch, depending on the (l+1)st character. Notice that in each node an additional null entry is added to allow for storing two numbers a and b where a is a prefix of b. For example, the trie of FIG. 2 can store the two words 91 and 911 by assigning 91 to the null entry of node A. In this instance, 91 is stored as a branch node and 911 is stored as a leaf node.

Figure 3:
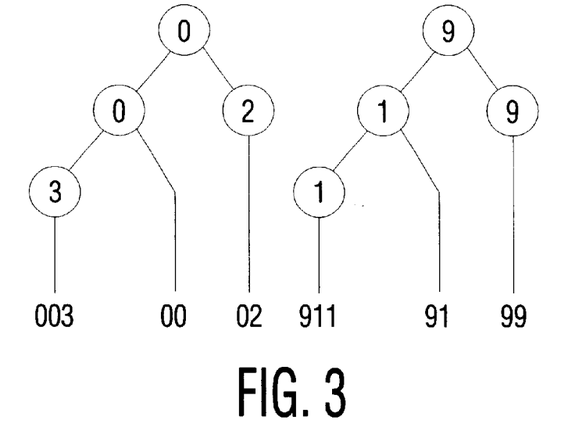
FIG. 3. illustrates a tree representation of the trie of FIG. 2.

The memory space of the trie structure can be significantly reduced (at the expense of running time) if, for example, a linked list is used for each node, since most of the entries in the nodes tend to be empty. This embodiment amounts to replacing the trie of FIG. 2 by the forest of trees shown in FIG. 3. Although the present invention is described using a trie data structure, it may also be implemented with other hierarchical data structures. As described below, the subject invention operates by traversing a single tree. Where the hierarchical data structure includes a forest of trees, it may be desirable to add a fictional root node to the data structure to simplify the processing of the data structure by the algorithm.

Searching for a word in the trie proceeds as follows. The search starts at the root and looks up the first letter, and then follows the pointer next to the letter and looks up the second letter in the word in the same way. On the other hand, searching in the forest version of the trie proceeds by finding the root node and matching the first letter in the query word, then finding the child node of that root which matches the second letter, etc. It can be shown that the average search time for N words stored in the trie is $\log_M N$ and that the "pure" trie requires a total of approximately N/lnM nodes to distinguish between N random words. Hence the total amount of space is MN/lnM.

There is a major difficulty with the trie data structure when used in conjunction with databases that contain errors in them. The trie data structure is prefix-sensitive. In the process of matching, when using depth-first search and backtracking, there is a tendency towards correcting mismatches that may have occurred at the deeper levels of the trie before correcting errors that may have occurred at higher levels. On the other hand, using conventional search techniques, the correcting of mismatches that may have possibly occurred at the higher levels of the trie (e.g., the root) is typically performed only after exhausting possible matches that are deeper in the trie.

Figure 4:
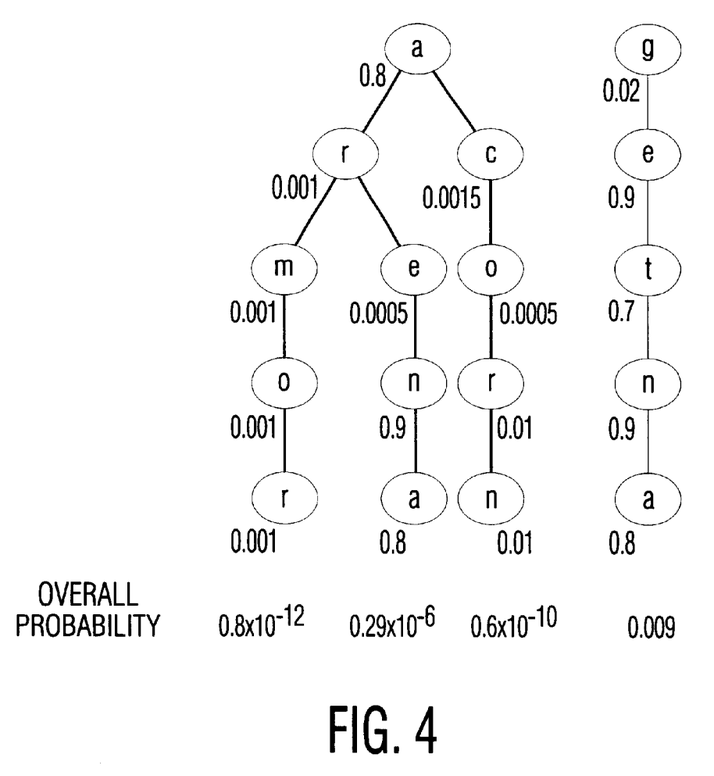
FIG. 4 is an example of a trie data structure.

For example, consider the trie of FIG. 4, and assume that the search is for the query word "aetna." Assume further that at document recognition time, the word "aetna" was erroneously recognized and stored into the database as the word "getna." The nodes are labeled by the probability of accepting the corresponding letter of the query word using the detailed error model given in Section 2.1. For example, from FIG. 4, the probability of recognizing the letter "e" of the word "aetna" as being the letter r (i.e., a 1-1 substitution error) is 0.001. The overall probability of accepting a word is computed as the product of all the accepting probabilities from the root to the leaf where the word is stored. For example, from FIG. 4, the overall probabilities of matching the query word "aetna" with the sequence "a", "c", "o", "r", "n" in the trie is: $0.8 \times 0.0015 \times 0.0005 \times 0.01 \times 0.01 = 0.6 \times 10^{-10}$. All the leaf nodes in the Figure are labeled with the overall accepting probabilities. Using a depth-first search algorithm, and given the query word "aetna" the node a is visited first since the word in the database was erroneously recognized as "getna" instead of "aetna." According to the depth-first search algorithm, the trie paths will be searched in the following order: acorn, armor, arena, and finally getna. Alternatively, notice that the order implied by the overall probabilities of the words is getna, arena, acorn, and armor. Moreover, if there are some additional limitations on the search time, the algorithm may run out of the allowable search time before it reaches the correct word (getna).

The above example demonstrates the sensitivity of the depth-first search algorithm to the decisions performed by the algorithm at the levels in the trie that are close to the root. The present invention provides a new algorithm, based on the A* graph search algorithm, that reduces the problems demonstrated above.

The new search algorithm uses a variant of the A* graph search algorithm to overcome prefix sensitivities of the trie. It can be used for matching words that may contain some errors in them.

An evaluation function f is computed at every visited node n during the search. f(n) is defined such that it provides an estimate of the overall probability of matching the query word with the words in the leaves of the subtree rooted at n. The value of f(n) determines the order by which the search algorithm visits the nodes of the trie. This is in contrast to visiting the nodes in a last-in first-out manner when using a depth-first-like algorithm.

A list termed OPEN is maintained that stores all the candidate nodes that are visited during the search. Nodes in OPEN are sorted in decreasing order by their f value. Initially this list includes only the root node of the trie or only the root nodes of the forest of the trees.

A path from the root to a leaf node defines a word in the database. Based on the A* search algorithm, and in the context of word matching, for an input word $s_{in}$, an optimal path is defined to be the path from the root node to the leaf that contains the word $s_m$ in the database such that $s_{in}$ has the highest accepting probability over the probabilities of all the other words in the database. For each node n, f*(n) is the highest possible matching probability for all the words in the database with paths passing through node n. This corresponds to a path passing from the root r to n and finally to the leaf node containing $w_n$. From this definition of f*, it can be concluded that, for the trie, the optimal match for an input word is f*(r) where r is the root of the trie, since r is in the path of all the words in the database.

Because it is very time-consuming to visit all the words in the database that descend from a given node n, f(n) is defined to be an estimate for the optimal value of f*(n). Furthermore, f(n) is expressed in two parts: g*(n) which is the actual overall probability of the path from the root node r to node n (there is only one such path in the case of the trie and hence this path is also an optimal one), and h(n) which is an estimate of the overall probability of the path from n to the leaf node of the word with the highest overall probability among all the words in the leaf nodes of the subtree rooted at n. Therefore, $$f(n)=g^*(n) \times h(n).$$

The value of f(n) is then an estimate of the overall probability of an optimal path from r constrained to go through node n.

Choosing h(t)=1 as an upper bound (since the probability is always less than or equal to one) results in a breadth-first search. The goal is to find tighter upper-bounds that help speed-up the A* search.

The maximum probability can be computed over all letters in the following way: Let L be the length of the query word, and let $d_t$ be the depth of a node t, where the root of the trie is at depth 0, i.e., $d_t$ is the length of the path from the root of the trie to node t. Also, let $s_{in}=a_1, a_2, \ldots a_L$ be the input word. Then, at depth $d_t$ of the trie, the part of the query word that is processed so far is a prefix of $s_{in}$ of length $d_t$, and can be expressed as: $s_t = a_1, a_2, \ldots a_{dt}$. The maximum possible h(t) can be attained if all of the remaining letters of $s_{in}$ (i.e., $a_{dt+1}, \ldots, a_L$ are matched by other letters that result in the highest possible probabilities, i.e., each of the remaining letters matches without any error. Therefore, h(t) can be estimated as:

For the detailed error model, $$h(t)=\Pi_{i=dt+1}^{L} p_n(a_i),$$

While for the simplified error model, $$h(t)=\Pi_{i=dt+1}^{L} p_n = p_n^{L-t}.$$

As described previously, the new search algorithm can handle the following types of errors: insertion, deletion, and m-n substitution errors. In order to accommodate framing errors, the elements of the list OPEN are in the form of the 5-tuples <error-type, node, word-location, g(node), h(node) >. The following describes the elements of OPEN:

error-type can have one of the following assignments:
1. m—an error-free match,
2. d—a deletion error,
3. i—an insertion error,
4. $s_{mn}$—an m-n substitution error, and node is the node of the trie to be visited when the 5-tuple is to be processed by the algorithm.

word-location is the location in the query word where the search will resume when the 5-tuple is to be processed by the algorithm.

g(node) is the probability of matching the prefix of the query word that has been processed so far with the nodes of the trie that correspond to the path from the root of the trie to the current node.

h(node) is the estimated probability of matching the remaining portion of the query word with the nodes of the trie that are descendents in the subtree rooted at node.

The overall evaluation function f(node) is computed as the product of g(node) and h(node). The 5-tuples in OPEN are sorted according to the values of f(n). At each step of the algorithm, the tuple with the highest possible f(n) is selected from OPEN and is visited by the algorithm. The query word is represented by the letters $a_1 a_2 \ldots a_L$, where L is the number of letters in the query word. Assume that the algorithm is at node n, and that the query word is matched up to letter $a_t$ (i.e., that the remaining portion of the word that still needs to be matched is: $a_{t+1}, \ldots a_L$) and the evaluation functions g=g(n) and h=h(n), i.e., the algorithm is processing the tuple <*,n,$a_t \ldots a_L$, g=g(n), h=h(n) >. The algorithm handles framing errors in the following way. Note that, in the discussion below, only 1-1, 1-2 and 2-1 substitution errors are described. The more general m-n form can be treated exactly similarly (the case of m>n is treated in the same way as the 2-1 case while the case of m<n is treated in the same way as the 1-2 case).

The following outline describes how the invention handles the errors:

1. no errors (or exact matching): The algorithm inserts the following tuple into the set OPEN:
   For the detailed error model, <m, child(n,s), $a_{t+1}, \ldots a_L$, g=g(n)×$p_n(a_t)$, h=$\Pi_{i=t+1} p_n(a_i)$>, while for the simplified error model, <m, child(n,s), $a_{t+1} \ldots a_L$, g=g(n)×$p_n$, h=$p_n^{L-t}$)>, where child(n,s) is the child node of n that corresponds to the letter s, g is the probability of the optimal path from the root to node n, and h is an estimate of the probability of matching the rest of the input word with the nodes of the trie.

2. 1-1 substitution errors (i. e., no framing errors): For each letter s in node n, the algorithm computes the probability: $p_s(s|a_t)$ and inserts the following tuple into the set OPEN:
   For the detailed error model, <$s_{11}$, child(n,s), $a_{t+1} \ldots a_L$, g=g(n)×$p_s(s|a_t)$, h=$\Pi_{i=t+1}^{L} p_n(a_1)$>, while for the simplified error model, <$s_{11}$, child(n,s), $a_{t+1} \ldots a_L$, g=g(n)×$p_{11}$, $h=pn^{L-t}$>.

3. deletion error: in this case, it is assumed that the current letter in the query word (the letter $a_t$) has no corresponding letter in the database word as $a_t$ was deleted from the database word during the scanning process. The search should resume from the next letter of the query word.
   As a result, the algorithm inserts the following tuples into OPEN: for each letter s in node n, the. algorithm inserts the following tuple into the set OPEN:
   For the detailed error model, <d,n,$a_{t+1} \ldots a_L$, g=g(n)×$p_d(a_t)$, h=$\Pi_{i=t+1}^{L} p_n(a_i)$>, while for the simplified error model, <d,n,$a_{t+1} \ldots a_L$)g=g (n)×$p_d$, h=$p_n^{L-t}$>.

4. insertion error: in this case, it is assumed that there is an extra letter being added into the database word during the scanning process, just prior to the position of current letter in the query word. This is treated by skipping the current node(node n), and matching the current letter with all of the letters that appear in the child nodes of node n.
   As a result, the algorithm inserts the following tuples into OPEN: for each child node u of n, and for each letter s in node u, the algorithm inserts the following tuple into the set OPEN:
   For the detailed error model, <I,child(u,s),$a_{t+1} \ldots a_L$, g=g(n)×$p_i(s)$, h=$\Pi_{i=t+1}^{L} p_n(a_i)$>, while for the simplified error model, <I,child(u,s),$a_{t+1} \ldots a_L$, g=g(n)×$p_i$, h=$p_n^{L-t}$>.

5. 2-1 substitution error: In this case, it is assumed that two letters of the query word were erroneously mapped to one letter that was inserted in the database instead of the two letters. This took place during the recognition process of the database word. This error type is treated by matching both the current and next letter of the query word with the current letter in the database node.

As a result, the algorithm takes the following actions: for each letter s in node n, the algorithm inserts the following tuple into the set OPEN:

For the detailed error model, $<s_{21},child(n,s),a_{t+2} \ldots a_L \ g=g(n) \times p(s|a_t a_{t+1}), h=\Pi_{i=t+2}^L p_n(a_i)>$, while for the simplified error model, p1 $<s_{21},child(n,s), a_{t+2} \ldots a_L, g=g(n) \times p_{s21}, h=p_n^{L-t-1}>$.

6. 1-2 substitution error: In this case, it is assumed that the current and next letters of the database word correspond to one letter that was split into two letters during the recognition process and then was inserted into the database. In other words, the, query word has the correct letter while the database word has two letters. This error type is treated by matching all the pairs of letters in the current node and its children nodes with the current letter of the query word.

The algorithm performs the following actions: for each letter s in node n, and for each letter $s_u$ that is in a child node u of n, the algorithm computes the probability: $p(ss_u|a_t)$ and inserts the following tuple into the set OPEN:

For the detailed error model, $<S_{12},child(u,s),a_{t+1} \ldots a_L, g=g(n) \times p(ss_u|a_t), h=\Pi_{i=t+1}^L p_n(a_i)>$, while for the simplified model, $<S_{12},child(u,s)a_{t+1} \ldots a_L, g=g(n) \times P_{s12}, h=p_n^{L-t}>$.

The values of $P_{11}, P_d, p_I, p_{sl}$, and $p_{s21}$ reflect the probabilities that the word scanned into the database contains an insertion, deletion or a substitution error. These probability values may also be viewed as parameters that can be tuned to direct the search. The exact values of these probabilities are scanner dependent and hence are difficult to quantify in general terms.

These values may be estimated by, for example, using results from studies that empirically measure the frequencies of occurrence of these types of errors by different types of scanners. Using these values as initial guesses, the system may be incrementally trained by updating the values of these parameters each time a match is performed by the system. An alternative method of calculating the probabilities is to perform a separate training session and then count the number of errors that occur in the session. These errors are then used as estimates for the desired probability values.

The invention maintains the following data structures: a list or queue OPEN and the list best_matches. The input to the method is a query word $s_{in}$ and an integer variable budget that controls the run-time of the invention; The variable budget gets decremented with each iteration of the invention.

Each time the entire query word is matched by a word in the trie, the matched word as well as its matching probability are stored in the sorted list best_matches. The size or number or words that can be kept in best_matches at a given time can be limited by a constant, say k. By the end of the searching process, the k words in best_matches can be reported as the best k matches that are found so far.

The outline of the method is given below. The method is outlined using the detailed error model. However, the method can be modified easily to use the simplified error model. Pseudo code for this method is shown in the following table.

TABLE 1. start at the root r of the trie
2. store $<m,r,a_1a_2 \ldots a_L, g=1, h=\Pi_{i=1}^L p_n(a_i)>$ into the list OPEN
3. Loop until budget is exhausted or no more nodes in OPEN:
   (a) tuple T←top element of OPEN
   (b) $n_T$←node(T)
   (c) gT←g(T), $h_T$=h(T)
   (d) if $n_T$ has no children (i.e., is a leaf node), then perform leaf-node-action; then
      i. $S_T$←word associated with leaf node $n_T$
      ii. if query word still has more unmatched characters (i.e., L>depth($n_T$) or even length($s_T$)≠length($s_{in}$)) then the extra letters are considered deleted from the query word, and hence $f=f^* \Pi_{i=depth(nT)+1}^L P_d(a_i)$
      iii. otherwise, compute $P(s_T)$, the entire probability of matching $S_T$.
      iv. if number of words in best_matches <k or if $P(s_T)$ is higher than any of the words in best_matches, insert $s_T$ into best_matches. This may result in excluding the word in best_matches that has the lowest matching probability.
   (e) expand node $n_T$ ($n_T$ is a non-leaf node):
      if all letters of $s_{in}$ are consumed, then skip $n_T$, else
      i. $a_t$←next letter in $s_{in}$.
      ii. decrease budget: budget←budget−1
      iii. for all letters s in $n_T$
         insert the following tuples into OPEN:
         $<m,child(n,s),a_{t+1} \ldots a_L, g=g(n) \times p_n(a_t) h=\Pi_{i=t+1}^L p_n(a_i)>$,
         $<s_{11}, child(n,s),a_{t+1} \ldots a_L, g=g(n) \times p_s(s|a_t), h=\Pi_{i=t+1}^L p_n(a_i)>$,
         $<d,n,a_{i+1} \ldots a_L, g=g(n) \times p_d(a_t), h=\Pi_{i=t+1}^L p_n(a_i)>$,
         $<S_{21}, child(n,s),a_{t+2} \ldots a_L, g=g(n) \times p(s|a_t a_{t+1}), h=\Pi_{i=2}^L p_n(a_i)>$,
      iv. for each child u of $n_t$,
         insert the following tuples into OPEN:
         $<I,child(u,s),a_{t+1} \ldots a_L, g=g(n) \times p_I(s), h=\Pi_{i=t+1}^L p_n(a_i)>$,
         $<s_{12},child(u,s),a_{t+1} \ldots a_L, g=g(n) \times p(ss_u|a_t), h=\Pi_{i=t+1}^L p_n(a_i)>$,
      v. reorder the nodes in OPEN in descending order based on their values of f=g×h.

Where a forest of trees is used instead of a trie, a fictional root node, corresponding, for example, to the null character, may be added to the forest of trees prior to step 1 shown in the Table. This converts the forest of trees into a single tree having a single root node.

The method shown in the Table is an alternative representation of the flow chart shown in FIG. 1.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of searching for a query word from among a plurality of words in a hierarchical data structure having branch nodes and leaf nodes, each branch node representing a respective component of one or more of the words and each leaf node representing a respective one of the words, the method comprising the steps of:

a) selecting a root node in the hierarchical data structure as the current node;
   b) identifying all possible child nodes of the current node in the hierarchical data structure;
   c) calculating, for each of the identified child nodes, a respective estimated probability value for matching each component of the query word with the component associated with a respective one of the branch nodes in a path taken in the hierarchical data structure from the root node through the current node, wherein the estimated probability is based on a simplified error model which is independent of specific letters, until a sufficient amount of training data is available and after the sufficient amount of training data is available the estimated probability is based on a more detailed error model;

d) adding the identified child nodes to a list of candidate nodes;

e) selecting, from the list of candidate nodes, one node having the respective estimated probability value which is greater than any other probability value as the current node;

f) determining if the current node is a leaf node and, if so, then determining whether to store the word representing the leaf node into a list of best matches; and g) repeating steps (b) through (g) until all components of the query word have been processed.

2. A method as defined in claim 1 wherein, the hierarchical data structure is a trie data structure representing a plurality of words wherein the trie data structure has a plurality of branch nodes and each branch node includes at least one child node, and the step (c) includes the step of determining a probability that a next portion of the query word matches each child node of the branch node.

3. A method as defined in claim 2, wherein, the trie data structure has N levels, ordinally numbered 0 through N-1 and step (d) includes for each candidate node, the step of:

calculating the estimated probability value associated with the selected element, according to the equation:

$$f(n)=g^*(n) \times h(n)$$

wherein f(n) is an estimate of the overall probability that the components of the query word match the components associated with respective ones of the branch nodes in an optimal path from a root node constrained to go through node n, $g^*(n)$ is the probability that respective components of the query word match the components associated with respective ones of the branch nodes in the path from the root node to the node n and h(n) is the overall probability that respective components of the query word match the components associated with respective ones of the branch nodes in the path from the node n to the leaf node of the word with a probability that is greater than the probability of any other words associated with the leaf nodes rooted at the root node.

4. A method as defined in claim 1 further comprising the steps of:

establishing a data structure which includes a plurality of entries, wherein each entry consists of a plurality of elements for each of the nodes in the hierarchical data structure, each entry containing elements identifying:

(1) a respective type of error condition that possibly results in a predetermined query sequence occurring; and (2) information identifying an estimated probability that the predetermined query sequence matches any of the plurality of words represented by the respective paths in the hierarchical data structure that pass through the child node associated with the entry, if the identified type of error condition is present, wherein, step (e) includes selecting the plurality of elements from among the elements with which the entries in the data structure are associated.

5. A method as defined in claim 4 wherein, the types of error conditions include error free matches, insertion errors, deletion errors and substitution errors.

6. A method as defined in claim 1 further including the steps of:

assigning a search time budget; and decrementing the search time budget with each execution of steps (c) through (g), and wherein, the selecting of new components in the query word in step (g) is inhibited when the search time budget has been exhausted.

7. A method as defined in claim 1 wherein, the list of best matches has a predetermined maximum number of entries and, after exceeding the predetermined number, the word in the list of best matches having the probability value which is less than any other probability value in the list of best matches is deleted from the list of best matches.

8. A computer readable medium encoded with a computer program which, when executed, causes a computer to search for a query word from among a plurality of words in a hierarchical data structure having branch nodes and leaf nodes, each branch node representing a respective component of one or more of the plurality of words and each leaf node representing a respective one of the plurality of words, the computer program causing the computer to perform the steps of:

a) selecting a root node in the hierarchical data structure as the current node;

b) identifying all possible child nodes of the current node in the hierarchical data structure;

c) calculating, for each of the identified child nodes, a respective estimated probability value for matching each component of the query word with the component associated with a respective one of the branch nodes in a path taken In the hierarchical data structure from the root node through the current node, wherein the estimated probability is based on a simplified error model, which is independent of specific letters, until a sufficient amount of training data is available and after the sufficient amount of training data is available the estimated probability is based on a more detailed error model;

d) adding the identified child nodes to a list of candidate nodes;

e) selecting, from the list of candidate nodes, one node having the respective estimated probability value which is greater than any other probability value as the current node;

f) determining if the current node is a leaf node and, if so, then determining whether to store the word representing the leaf node into a list of best matches; and g) repeating steps (b) through (g) until all components of the query word have been matched.

9. A computer readable medium according to claim 8 wherein the computer program further causes the computer to perform the following steps:

establishing a data structure which includes a plurality of entries, wherein each entry consists of a plurality of elements for each of the nodes in the hierarchical data structure, each entry containing elements identifying:

(1) a respective type of error condition that possibly results in a query sequence occurring; and (2) information identifying an estimated probability that the query sequence matches any of the plurality of words represented by the respective paths In the hierarchical data structure that pass through the child node associated with the entry, if the identified type of error condition is present, wherein, step (b) includes selecting the plurality of elements from among the elements with which the entries in the data structure are associated.

10. A computer readable medium according to claim 8 wherein, the hierarchical data structure is a trie data structure representing a plurality of words wherein, the trie data structure has a plurality of branch nodes, wherein, each branch node includes at least one child node, wherein the computer program, at step (c) causes the computer to perform the step of determining a probability that a next portion of the query word matches each child node of the branch node.

11. A computer readable medium according to claim 10 wherein, the trie data structure has N levels, ordinally numbered 0 through N-1 and step (d) includes for each candidate node, further causing the computer to perform the step of:

calculating the estimated probability value associated with the selected element, according to the equation:

$$f(n) = g^*(n) \times h(n)$$

wherein f(n) is an estimate of the overall probability that the components of the query word match the components associated with respective ones of the branch nodes in an optimal path from a root node constrained to go through node n, g*(n) is the probability that respective components of the query word match the components associated with respective ones of the branch nodes in the path from the root node to the node n and h(n) is the overall probability that respective components of the query word match the components associated with respective ones of the branch nodes in the path from the node n to the leaf node of the word with a probability that is greater than the probability of any other words associated with the leaf nodes rooted at the root node.

* * * * *

UNITED STATES PATENT AND TRADEMARK OFFICE
CERTIFICATE OF CORRECTION

PATENT NO. : 6,662,180 B1
DATED : December 9, 2003
INVENTOR(S) : Walid G. Aref and Junichi Kanai It is certified that error appears in the above-identified patent and that said Letters Patent is hereby corrected as shown below:

Title page,
Item [54], Title, "METHOD FOR SEARCHING IN LARGE DATABASES OF AUTOMATICALLY RECOGNIZED TEXT" should read -- METHOD FOR SEARCHING IN LARGE DATABASES OF AUTOMATICALLY RECOGNIZED TEXT THROUGH USE OF SIMPLIFIED AND DETAILED ERROR MODELS --.

Signed and Sealed this

Twenty-fifth Day of May, 2004

JON W. DUDAS
*Acting Director of the United States Patent and Trademark Office*